United States Patent
Alexander

(10) Patent No.: US 12,410,087 B2
(45) Date of Patent: Sep. 9, 2025

(54) BATCH AND CULLET PROPORTIONING APPARATUS

(71) Applicant: Jeffrey C. Alexander, Newbury, MA (US)

(72) Inventor: Jeffrey C. Alexander, Newbury, MA (US)

( * ) Notice: Subject to any disclaimer, the term of this patent is extended or adjusted under 35 U.S.C. 154(b) by 231 days.

(21) Appl. No.: 18/113,740

(22) Filed: Feb. 24, 2023

(65) Prior Publication Data
US 2023/0278904 A1   Sep. 7, 2023

Related U.S. Application Data

(60) Provisional application No. 63/315,271, filed on Mar. 1, 2022.

(51) Int. Cl.
| C03B 1/00 | (2006.01) |
| C03B 3/00 | (2006.01) |
| C03C 1/00 | (2006.01) |

(52) U.S. Cl.
CPC ............ C03B 1/00 (2013.01); C03B 3/005 (2013.01); C03C 1/002 (2013.01)

(58) Field of Classification Search
None
See application file for complete search history.

(56) References Cited

U.S. PATENT DOCUMENTS

| 2,715,517 | A | 8/1955 | Bojner |
| 2,848,198 | A | 8/1958 | Bill |
| 3,545,988 | A | 12/1970 | Slade |
| 3,753,743 | A * | 8/1973 | Kakuda .................. C03C 1/026 501/72 |
| 3,845,941 | A | 11/1974 | Mendenhall |
| 3,975,002 | A | 8/1976 | Mendenhall |

(Continued)

FOREIGN PATENT DOCUMENTS

| CN | 207405066 U | 5/2018 |
| CN | 209428388 U | 9/2019 |

(Continued)

OTHER PUBLICATIONS

JP 56-120522 machine translation, Kato et al., Glass Melting Furnace, Sep. 1981 (Year: 1981).*

(Continued)

Primary Examiner — Queenie S Dehghan
(74) Attorney, Agent, or Firm — Nields, Lemack & Frame, LLC

(57) ABSTRACT

Apparatus, system, and method for blending batch and cullet at a predetermined cullet ratio for feeding to a furnace. It includes a first hopper for holding cullet; a second hopper for holding batch; feeder associated with the second hopper; a chamber positioned to receive cullet from the first hopper, an inlet spout configured to receive cullet from the first hopper so that cullet flood feeds into the chamber to keep it constantly filled with cullet up to its angle of repose, and an outlet spout; a chute positioned to receive batch from the feeder and extending into the chamber and having a chute outlet having a diameter equal to or larger than the outlet spout; a charger for receiving mixed batch and cullet from the chamber; and a controller operatively connected to the feeder and to the charger.

8 Claims, 7 Drawing Sheets

(56) References Cited

U.S. PATENT DOCUMENTS

| | | | |
|---|---|---|---|
| 4,184,861 A | 1/1980 | Erickson et al. |
| 4,225,332 A | 9/1980 | Tsay |
| 4,248,616 A | 2/1981 | Seng et al. |
| 4,303,434 A | 12/1981 | Rough, Sr. et al. |
| 4,350,512 A | 9/1982 | Krumwiede |
| 4,353,726 A | 10/1982 | Rough, Sr. |
| 4,410,347 A | 10/1983 | Krumwiede |
| 4,684,342 A | 8/1987 | Harcuba |
| 4,696,690 A | 9/1987 | Roloff |
| 4,797,092 A | 1/1989 | Pieper |
| 4,913,069 A | 4/1990 | Schultz et al. |
| 4,977,839 A | 12/1990 | Fochtman et al. |
| 5,052,810 A | 10/1991 | Brock |
| 5,123,942 A | 6/1992 | Argent et al. |
| 5,125,943 A | 6/1992 | Cole |
| 5,290,334 A | 3/1994 | Alexander |
| 5,342,427 A | 8/1994 | Alexander |
| 5,344,229 A | 9/1994 | Nath et al. |
| 5,399,181 A | 3/1995 | Sorg |
| 5,529,762 A | 6/1996 | Alexander |
| 5,538,340 A | 7/1996 | Brashears |
| 5,556,443 A | 9/1996 | Alexander |
| 5,578,102 A | 11/1996 | Alexander |
| 5,603,910 A | 2/1997 | Alexander |
| 5,716,205 A | 2/1998 | Tratz |
| 5,741,342 A | 4/1998 | Alexander |
| 5,759,507 A | 6/1998 | Delling et al. |
| 5,773,529 A | 6/1998 | Alexander |
| 5,779,748 A | 7/1998 | Alexander |
| 5,855,636 A | 1/1999 | Alexander |
| 5,954,851 A | 9/1999 | Sakae |
| 6,196,710 B1 | 3/2001 | Swanson et al. |
| 6,615,612 B2 | 9/2003 | Alexander |
| 7,669,792 B1 | 3/2010 | Anderson et al. |
| 8,099,981 B2 | 1/2012 | Barklage et al. |
| 9,664,445 B2 | 5/2017 | Trattner et al. |
| RE46,896 E | 6/2018 | Charbonneau |
| 2007/0227191 A1 | 10/2007 | Kobayashi et al. |
| 2010/0279242 A1 | 11/2010 | Barklage et al. |
| 2012/0085845 A1 | 4/2012 | Landis |
| 2013/0026275 A1 | 1/2013 | Landis |
| 2013/0199240 A1 | 8/2013 | Lindig et al. |
| 2015/0007445 A1 | 1/2015 | Gebhard et al. |
| 2016/0023936 A1 | 1/2016 | Lindig et al. |
| 2017/0121206 A1 | 5/2017 | Kobayashi |
| 2018/0029915 A1 | 2/2018 | Huber |
| 2018/0305213 A1 | 10/2018 | Lin et al. |
| 2021/0048254 A1 | 2/2021 | Yoshida et al. |
| 2023/0038523 A1 | 2/2023 | Alexander |
| 2023/0040599 A1 | 2/2023 | Alexander |
| 2024/0383792 A1 | 11/2024 | Alexander |

FOREIGN PATENT DOCUMENTS

| | | |
|---|---|---|
| CN | 112005072 A | 11/2020 |
| CN | 113173689 A | 7/2021 |
| WO | 2021/148599 A1 | 7/2021 |

OTHER PUBLICATIONS

Office Action mailed Feb. 8, 2024 in co-pending U.S. Appl. No. 17/880,256.

Office Action mailed Oct. 16, 2024 in co-pending U.S. Appl. No. 17/880,253.

Final Rejection mailed Oct. 26, 2023 in co-pending U.S. Appl. No. 17/880,256.

Office action mailed May 8, 2023 in co-pending U.S. Appl. No. 17/880,256.

European communication dated Aug. 7, 2023 in corresponding European patent application No. 23158942.5.

European communication dated Nov. 29, 2024 in co-pending European patent application No. 22188675.7.

Office action mailed Jul. 27, 2023 in co-pending U.S. Appl. No. 17/880,256.

US Department of Energy, Energy Efficiency and Renewable Energy, Industrial Technologies Program, "Electrostatic Batch Preheater System: New System Uses Furnace Exhaust to Preheat Batch and Cullet and Abate Emissions in Glass Melting", Mar. 2007, 2 pages.

The American Ceramic Society, A Collection of Papers Presented at the 61st Conference on Glass Problems: Ceramic Engineering and Science Proceedings, vol. 22, Issue 1, copyright 2001, published online Mar. 26, 2008, edited by Charles H. Drummond, Chapter 4 "Electrostatic Batch Preheating Technology: E-Batch", pp. 37-53, by Jeffrey C. Alexander.

Leone Industries: Experience with Cullet Filter/Preheater, Glass Problems Conference Presentation, Oct. 30, 2006, pp. 1-8, by Larry Barrickman & Peter Leone.

Office action mailed Mar. 20, 2015 in co-pending U.S. Appl. No. 14/025,055.

Final Rejection mailed Oct. 28, 2015 in co-pending U.S. Appl. No. 14/025,055.

Office action mailed May 1, 2015 in co-pending U.S. Appl. No. 14/025,070.

Office action mailed Aug. 10, 2015 in co-pending U.S. Appl. No. 14/025,070.

European communication dated Apr. 4, 2023 in corresponding European patent application No. 22188676.5.

European communication dated Dec. 20, 2022 in co-pending European patent application No. 22188675.7.

European communication dated Dec. 20, 2022 in corresponding European patent application No. 22188676.5.

Notice of Allowance mailed May 2, 2024 in co-pending U.S. Appl. No. 17/880,256.

Final Rejection mailed Feb. 5, 2025 in co-pending U.S. Appl. No. 17/880,253.

Office Action mailed May 19, 2025 in co-pending U.S. Appl. No. 17/880,253.

European communication dated Jun. 3, 2025 in corresponding European patent application No. 23158942.5.

* cited by examiner

FIG. 3B SECTION A-A

FIG. 3C SECTION B-B

BATCH AND CULLET PROPORTIONING APPARATUS

This application claims priority of U.S. provisional application Ser. No. 63/315,271 filed on Mar. 1, 2022, the disclosure of which is hereby incorporated by reference.

BACKGROUND

Embodiments disclosed herein relate to methods and apparatus for proportioning preheated raw materials for glass manufacture using waste heat from a glass melting process, specifically heating them separately and then blending them prior to being fed into a furnace.

Glass is made by heating and melting a mixture of solid raw materials to a liquid state. The melting is done inside of a furnace and necessarily requires substantial amounts of heat. Typically, this heat is generated by the combustion of fossil fuels with the exhaust gases from the combustion leaving the furnace. Exhaust gas temperatures immediately after the furnace are quite high, typically 1300-1450° C. In some cases, combustion air preheaters are included which recover some of the heat in these gases. Even so, gas temperatures at the discharge to atmosphere are quite high, thus substantial amounts of heat are wasted. The cost of fuel for heating the furnace is a major component in the cost of making glass.

The raw materials for glass are typically referred to as batch and cullet. The word batch generally refers to an assemblage of various pulverous materials including silica sand, limestone, soda ash, salt cake, and a variety of other minor ingredients. The material and mixture ratios are carefully chosen to produce glass of the desired properties and quality. Generally, these materials are prepared in a finely divided form to promote their melting rates. Sizes are typically 100 to 200 μm diameter with a maximum size of 1 mm.

The word cullet generally refers to recycled glass, either from the factory or from external sources. Cullet from the factory is typically less than 10% of the production rate of the furnace, being generated by product breakage, or product rejected due to defects. Factory cullet typically is gathered from the various sources in the plant, crushed to sizes less than 100 mm and collected in a central storage hopper.

Cullet from external sources, referred to as Post Consumer Recycle (PCR) Cullet, generally comes from glass bottle recycling programs in the community. The amount of PCR cullet in each furnace can vary widely, from as little as 0% of production rate up to 80%. PCR cullet is generally laden with impurities such as organic residues, paper, plastics, and other non-glass materials mistakenly deposited into recycling containers. PCR cullet may be delivered to the glass factory by truck or rail carriers from the recycling centers. PCR cullet is normally delivered in a coarse crushed form of size less than 100 mm.

The batch and cullet are typically blended before introduction to the melting furnace. The glass maker will carefully control the relative amounts of the cullet and batch in the blend to achieve the desired glass quality and match the amount of cullet supply available to the plant. The amount of cullet fed into the furnace divided by the glass production rate of the furnace is termed the "Cullet Ratio". Glass makers can specify the desired cullet ratio to be anywhere from 10% to as great as 90% and is an important operational parameter of the glass production facility.

The embodiments disclosed herein can be advantageously used to blend batch and cullet (preheated by exhaust gases) with controlled proportions. By preheating these materials before they are introduced to the furnace, the amount of fuel required for heating and melting them in the furnace can be reduced. This fuel reduction can represent a substantial economic benefit to the glass making process and reduces the emission of harmful gases (such as NOx and $CO_2$) simply because less fuel is burned. It has been found that separately preheating batch and cullet is operationally advantageous. Physical properties of batch and cullet are significantly different, so each heat exchanger can be optimally designed if they are heated separately. However, this approach necessitates the blending of heated batch and cullet before introduction to the glass furnace. Handling of hot materials is notoriously difficult and can lead to significant heat losses and excessive maintenance, so the need exists for a simple reliable apparatus.

Fossil fuel fired glass furnaces are of several different designs. When air is combusted with fuel, the air is typically preheated in regenerative or recuperative heat exchangers, utilising some of the waste heat exiting the furnace. As well, nominally pure oxygen can also be used for combustion, in which case no waste heat recovery equipment is typically involved.

While the embodiments disclosed herein could be advantageously applied to any of the glass production schemes, its benefits are greatest in the case of oxygen-fuel fired furnaces. This is because exhaust gas temperatures are higher, thus batch and cullet can be preheated to high temperatures, and because reduction in fuel requirements for the furnace is accompanied by a proportional reduction in the oxygen supply (and thus cost) for the furnace.

The embodiments disclosed herein represent an improvement on prior art. They are aimed at resolving several of the technical limitations and problems associated with various techniques proposed earlier.

SUMMARY

In view of the foregoing, the following are certain objects and/or benefits of the described embodiments:
1) Keeping the batch and cullet separate.
2) Passing cullet by gravity through devices in the following sequence:
   a) A storage hopper mounted on load cells to measure the weight of the hopper and its contents.
   b) A heat exchanger to transfer heat from furnace exhaust gases to the cullet.
   c) A chamber where batch and cullet are mixed, such as a proportioning cylinder.
3) Passing batch through devices in the following sequence:
   a) A storage hopper mounted on load cells to measure the weight of the hopper and its contents;
   b) Optionally, a second heat exchanger to transfer heat from furnace exhaust gases to the batch;
   c) A screw feeder with variable speed drive to feed hot batch from the heat exchanger and into a chambre where it mixes with cullet, such as a proportioning cylinder.
4) Blended batch and cullet flowing by gravity out of a chamber such as a proportioning cylinder and into a furnace charging machine, said charging machine feeding the hot blended material into a glass furnace.

In certain embodiments, disclosed is an apparatus for blending batch and cullet and controlling their respective amounts to achieve a predetermined cullet ratio, said apparatus comprising:

a) a first hopper for holding cullet;
b) a second hopper for holding batch equipped with a rate adjustable feeder to continuously discharge batch from said second hopper;
c) a chamber comprised of:
  i) an inlet spout to receive cullet from the first hopper arranged so cullet flood feeds into the chamber to keep it constantly filled with cullet up to its angle of repose from the inlet spout;
  ii) a floor at the bottom of the chamber that causes cullet to form a stagnant pile inside the chamber;
  iii) an outlet spout in the floor;
  iv) a substantially vertically oriented chute to receive batch from the batch feeder;
    (1) said batch free falling through the chute;
    (2) said chute positioned directly over the outlet spout and of substantially the same diameter as the outlet spout or larger;
    (3) said chute extending downwardly into the chamber from the discharge of the batch feeder to a level below the top surface of cullet formed by its angle of repose;
    (4) the bottom of said chute being open and at a distance from the outlet spout at least one times the diameter of the chute;
    (5) said chute arranged so cullet from the chamber forms a surface at the bottom of the chute so free-falling batch falls onto the cullet surface, thus mixing batch with cullet;
d) a rate adjustable furnace charging machine to continuously feed mixed batch and cullet into the glass furnace;
  i) said rate being adjusted to maintain glass level inside the furnace;
  ii) said charging machine positioned below the chamber to receive the mixed batch and cullet from the chamber by gravity in a flood feed condition; and
e) a controller for controlling the feeder rate of the rate adjustable feeder so that the desired proportions of batch and cullet are fed into the furnace.

In certain embodiments the hopper for holding batch may be mounted on one or more load cells to continuously measure the weight of the hopper and its batch contents. In some embodiments, the production rate of the furnace is measured, and a computer system uses the batch hopper load cell information and the furnace production rate information to adjust the batch feeder rate so as to achieve a desired cullet ratio.

In certain embodiments, the hopper for holding cullet may be mounted on one or more load cells to continuously measure the weight of the hopper and its cullet contents, the production rate of the furnace is measured, and a computer system uses cullet load cell information and the furnace production rate information to adjust the batch feeder rate so as to achieve a desired cullet ratio.

In certain embodiments, the hopper for holding cullet may be mounted on one or more load cells to continuously measure the weight of the hopper and its cullet contents; the hopper for holding batch may be mounted on one or more load cells to continuously measure the weight of the hopper and its batch contents; and a computer system uses cullet load cell information and the batch load cell information to adjust the batch feeder rate to achieve a desired cullet ratio.

In certain embodiments, the further comprises a device to preheat cullet before it flows by gravity into a cullet and batch blending chamber. In some embodiments, the apparatus further comprises a device to preheat batch before it is fed into a cullet and batch blending chamber. In some embodiments, the apparatus further comprises a device to preheat cullet before it flows by gravity into a cullet and batch blending chamber and a device to preheat batch before it is fed into a cullet and batch blending chamber.

Various embodiments relate to apparatus for blending batch and cullet and controlling their respective amounts to achieve a predetermined cullet ratio to be fed to a furnace, the apparatus comprising:
  a first hopper for holding cullet;
  a second hopper for holding batch;
  a rate adjustable feeder associated with the second hopper;
  a chamber positioned to receive cullet from said first hopper, said chamber having a floor for accumulation of cullet from said first hopper, an inlet spout configured to receive cullet from said first hopper so that cullet flood feeds into said chamber to keep it constantly filled with cullet up to its angle of repose, and an outlet spout;
  a chute positioned to receive batch from the rate adjustable feeder, the chute extending into the chamber and having a chute outlet, the chute outlet having a diameter equal to or larger than the outlet spout and being spaced from the outlet spout;
  a rate adjustable charger for receiving mixed batch and cullet from the chamber; and
  a controller operatively connected to the rate adjustable feeder and to the rate adjustable charger for controlling the amount of batch fed to the chute and for feeding mixed batch and cullet having the predetermined cullet ratio to the furnace.

In certain embodiments, the chute is positioned directly over the outlet spout.

In certain embodiments, the chute outlet is positioned above the outlet spout a distance of at least one times the diameter of the outlet spout.

In certain embodiments, one or more load cells are provided and configured to continuously measure the weight of the first hopper and its contents.

In certain embodiments, one or more load cells are provided and configured to continuously measure the weight of the second hopper and its contents.

In certain embodiments, a preheater is provided and configured to preheat cullet prior to it being fed to the chamber.

In certain embodiments, a preheater is provided and configured to preheat batch prior to it being fed to the chamber.

In certain embodiments, the chamber has an inlet spout configured to receive cullet from the first hopper so that cullet flood feeds into the chamber to keep it constantly filled with cullet up to its angle of repose.

Various embodiments relate to a system for regulating the cullet ratio of a mixture of cullet and batch to be fed to a furnace, the system comprising:
  a first hopper for holding cullet;
  a second hopper for holding batch;
  a rate adjustable feeder associated with the second hopper;
  a chamber positioned to receive cullet from said first hopper, said chamber having a floor for accumulation of cullet from said first hopper, an inlet spout configured to receive cullet from said first hopper so that cullet flood feeds into said chamber to keep it constantly filled with cullet up to its angle of repose, and an outlet spout;

a chute positioned to receive batch from the rate adjustable feeder, the chute extending into the chamber and having a chute outlet, the chute outlet having a diameter equal to or larger than the outlet spout and being spaced from the outlet spout;

a rate adjustable charger for receiving mixed batch and cullet from the chamber;

a first load cell for measuring the weight of the first hopper and cullet contained therein;

a second load cell for measuring the weight of the second hopper and batch contained therein;

a controller in communication with the first and second load cells and operatively connected to the rate adjustable feeder and to the rate adjustable charger for controlling the amount of batch fed to the chute and for feeding mixed batch and cullet having the predetermined cullet ratio to the furnace.

In certain embodiments, the chamber has an inlet spout configured to receive cullet from the first hopper so that cullet flood feeds into the chamber to keep it constantly filled with cullet up to its angle of repose.

Various embodiments relate to a method for controlling the cullet ratio of a mixture of batch and cullet fed to a glass furnace having a glass furnace production rate, wherein the method comprises:

measuring a weight of cullet in a hopper;

calculating a cullet feed rate from a plurality of measurements of the weight of cullet in the hopper taken over time;

calculating a cullet ratio by dividing the cullet feed rate by the glass furnace production rate;

comparing the calculated cullet ratio to a predetermined cullet ratio set point; and modifying the rate at which batch is fed to chamber where batch and cullet are mixed based upon the comparison.

In certain embodiments, the batch feed rate is increased if the calculated cullet ratio is greater than the cullet ratio set point, and the batch feed rate is decreased if the calculated cullet ratio is less than the cullet ratio set point.

Various embodiments relate to a method for controlling the cullet ratio of a mixture of batch and cullet fed to a glass furnace having a glass furnace production rate, wherein the method comprises:

calculating a batch feed rate set point by multiplying the glass furnace production rate by (1) 1 minus a predetermined cullet ratio set point and by (2) 1 minus a predetermined fusion loss, where the fusion loss is the mass percentage of batch fed into the furnace that is volatized in the furnace and exhausted from the furnace;

measuring a weight of batch in a hopper;

calculating a batch feed rate from a plurality of measurements of the weight of batch in the hopper taken over time;

comparing the calculated batch feed rate to the calculated batch feed rate set point; and modifying the rate at which batch is fed to the chamber where batch and cullet are mixed based upon the comparison.

In certain embodiments, the batch feed rate is increased if the calculated batch feed rate is less than the batch feed rate set point, and the batch feed rate is decreased if the calculated batch feed rate is greater than the batch feed rate set point.

Various embodiments relate to a method for controlling the cullet ratio of a mixture of batch and cullet fed to a glass furnace having a glass furnace production rate, wherein the method comprises:

measuring a weight of cullet in a first hopper;

measuring a weight of batch in a second hopper;

calculating a cullet feed rate CFR from a plurality of measurements of the weight of cullet in the first hopper taken over time;

calculating a batch feed rate BFR from a plurality of measurements of the weight of batch in the second hopper taken over time;

calculating a cullet ratio CR using the following formula:

$$CR = CFR/(CFR + BFR(1-FL))$$

where FL is a predetermined fusion loss of the glass furnace, where the fusion loss is the mass percentage of batch fed into the glass furnace that is volatized in the glass furnace and exhausted from the furnace;

comparing the calculated cullet ratio to a predetermined cullet ratio set point; and modifying the rate at which batch is fed to chamber where batch and cullet are mixed based upon the comparison.

In certain embodiments, the batch feed rate is increased if the calculated cullet ratio is greater than the cullet ratio set point, and the batch feed rate is decreased if the calculated cullet ratio is less than the cullet ratio set point.

BRIEF DESCRIPTION OF THE DRAWINGS

The above and other aspects of the embodiments disclosed herein will now be described in further detail, by way of example only, with reference to the accompanying drawings, in which:

FIG. 3B is an orthogonal cross-sectional view of the proportioning cylinder apparatus taken along line A-A of FIG. 3A;

FIG. 3C is an orthogonal cross-sectional view of the proportioning cylinder apparatus taken along line B-B of FIG. 3B;

DETAILED DESCRIPTION

The embodiments disclosed herein may be referred to as a Batch and Cullet Proportioning (BCP) System. In the system, batch and cullet can optionally be separately heated, such as in two different types of heat exchanger, then blended before being charged into a furnace such as a glass melting furnace. Batch and cullet behave significantly different when handled and heated. Their material properties are significantly different, for example particle size, water solubility, abrasiveness, dust generation potential, segregation potential, agglomerate formation, moisture content, volatility, etc. It proves to be particularly advantageous to heat batch and cullet in separate devices. But blending the two materials together while simultaneously controlling the relative amounts of each fed into the furnace presents a significant engineering challenge. The embodiments disclosed herein solve these challenges and thus enable the use of separate batch and cullet preheaters.

Figure 1:
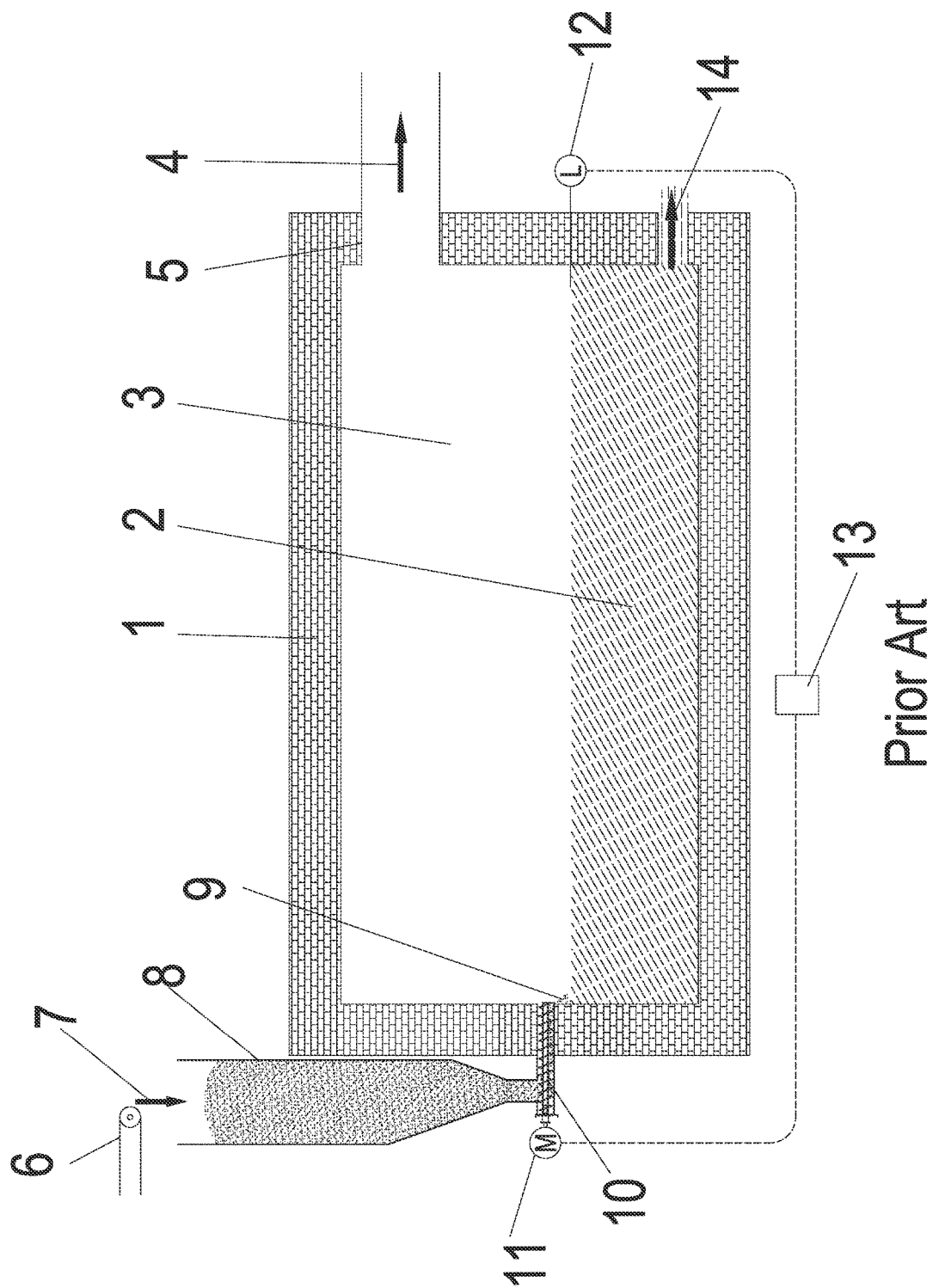
FIG. 1 is a cross-sectional side view of a typical glass furnace with raw material feed system.

A conventional glass furnace is depicted in FIG. 1. Glass melting furnace 1 is filled with molten glass 2. Natural gas burners (not shown) are fired into the combustion space 3 above the glass melt 2, transferring heat to the melt. Exhaust gases from the combustion exit the furnace at 4 through port 5. Substantial amounts of heat are exhausted from the furnace and represent wasted heat. Molten glass 14 exits the furnace and flows to forming machines for further processing into glass product.

In a conventional plant, batch and cullet are blended by conventional material handling equipment and then carried on conveyor 6 which discharges at 7 into day bin 8. From the day bin 8, mixed batch and cullet are fed at 9 into the furnace 1 by charging machine 10. Charging machine 10 can be a screw feeder, vibrating feeder, pusher bar feeder, or a combination of these mechanisms. Charging machine 10 is equipped with a rate controlling device 11, typically a motor with variable speed drive. By adjusting the motor speed, the feed rate of material fed into the furnace 1 can be adjusted in real time.

Glass melting furnace 1 is equipped with a level measurement device 12 which indicates whether the top level of the glass melt 2 is above or below a desired set point level. A feedback control system 13 is provided which will receive an indicator signal from level measurement device 12 and then adjusts the operating speed of controlling device 11. If the glass melt level is below the set point, the speed will increase, if the glass melt level is below the set point, the speed will decrease. In this way, the charging machine 10 can be operated continuously with rate adjusted to maintain glass level in the furnace.

Figure 2:
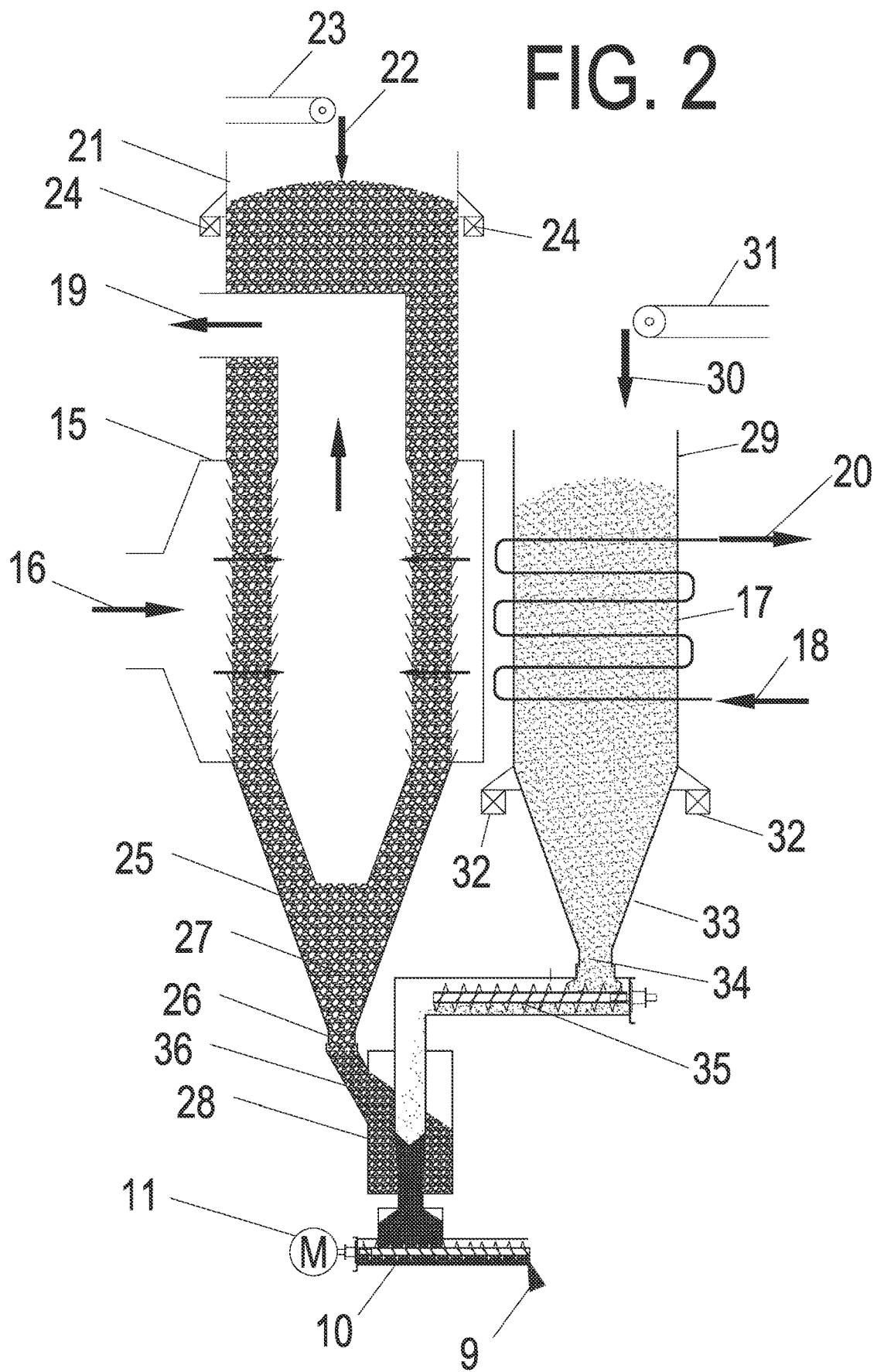
FIG. 2 is a cross-sectional side view of apparatus in accordance with certain embodiments.

An overall BCP system is depicted in FIG. 2 in accordance with certain embodiments. Exhaust gases 4 (FIG. 1) exit the furnace and are carried by ducts or the like to the inlet 16 of a cullet preheater 15 and the inlet 18 of a batch preheater 17. Cooled gases are drawn from cullet preheater (CPH) at 19 and from the batch preheater (BPH) at 20. Desired proportioning of exhaust gas introduction as between the inlet 16 of the CPH and the inlet 18 of the BPH may be carried out with conventional ductwork and valving as known by those skilled in the art. One or more fans (not shown) may be provided downstream of both devices to serve as the driving force to for exhaust gas introduction and/or cooled gas withdrawal.

In certain embodiments, in the CPH 15 hot gases flow through the cullet and heat is transferred from the gases to the cullet by direct contact, cooling the gases and heating the cullet in the process. The cullet pieces are relatively large, typically 10 to 75 mm, and the gas travels through the interstices of the cullet bed. Because of the large surface area of cullet in direct contact with the hot gases, the hot gases are usually cooled with less than 1 second of time in contact with the cullet, and the cullet can be heated to within 20'C of the temperature of the incoming hot gases.

In certain embodiments, cullet moves slowly downward through the bed by action of gravity with cold cullet entering the top of the bed and heated cullet exiting the bottom of the bed. Cullet has a maximum practical temperature of 450° C. before it begins to soften and can fuse together.

In certain embodiments, a cullet receptacle such as a storage hopper 21 may be positioned directly above the CPH 15 and is shown attached to it or integral to it. Cullet 22 may be intermittently delivered to the storage hopper 21 such as via conveyor 23 to provide cullet to the hopper. For example, when the cullet level in the hopper reaches a level determined to be low or insufficient, a level sensor may be used to send a signal to a cullet delivery system which sends a fixed quantity of cullet to the hopper in response to that signal, such as a quantity sufficient to fill the hopper. Timing of such fill depends on the hopper capacity and cullet feed rate through the CPH In the embodiment shown, cullet delivery at 22 free falls into the storage hopper 21.

The cullet delivery is terminated before the cullet top level in the storage hopper 21 reaches the conveyor 23. In certain embodiments, the top of the storage hopper 21 is not connected to any other equipment and is completely supported on one or more load cells 24. The CPH 15 is supported from the storage hopper 21. A conical hopper 25 is supported from the CPH 15. In this way one or more load cells continuously measure the weight of CPH 15, storage hopper 21, conical hopper 25 and their cullet contents. The conical hopper 25 may be some other suitable shape besides conical, as known by those skilled in the art.

In certain embodiments, the hopper 25 is a circularly symmetric conical hopper situated below the CPH so that heated cullet will feed out of the bottom of the hopper 25 through a spout 26. The hopper 25 is filled as shown at 27 with heated cullet. Heated cullet flows through the spout 26 into chute 36 and then into a chamber such as a proportioning chamber 28 which may be shaped as a cylinder. The spout 26 is configured so that it does not touch the chute 36, enabling the load cells 24 to give a true measure of the total weight of the storage hopper 21, CPH 15, hopper 25, and their cullet contents. During the intervals when there is no cullet 22 delivered to the storage hopper 21, the load cells will show a weight that is decreasing with time since the cullet continues to feed out of the hopper 25. The load cell measurements can then be gathered over time and averaged to determine the cullet feed rate (CFR) usually expressed as pounds per hour.

While cullet 22 is being delivered to the hopper 21, the weighed device (defined as the hopper 21, CPH 15, and hopper 25) has material both fed into it and fed out of it. When cullet is not being fed into the hopper 21 from conveyor 23, the weighed device is operating in "flood feed output" condition. It has been discovered by the inventor that the one or more load cells 24 will accurately weigh the weighed device and its contents, even if the cullet in the hopper 25 is in contact with cullet in the chute 36, so long as the cullet is in continuous motion. In this way, the weighed device can be operated in flood feed output and the one or more load cells 24 will measure weight of the weighed device and its contents. By comparing this measurement at subsequent times, the outfeed rate of cullet can be calculated. For example, if the weight measurement is 10000 kg at time T and then 9600 kg at time T+2 minutes, the outfeed rate is (10000 kg-9600 kg)/2 min=200 kg/min. This procedure may be repeated periodically (e.g., every 2 minutes) and then results averaged after a plurality of measurements (e.g., every 10 measurements) to achieve an accurate running average, for example.

In the BPH 17 hot gases flow through the heat exchanger and heat is transferred from the gases to the batch, cooling the gases and heating the batch in the process.

Batch moves through the heat exchanger such as by gravity, with cold batch entering the top of the heat exchanger and heated batch exiting the bottom of the heat exchanger.

In certain embodiments, a batch storage hopper 29 is positioned directly above the BPH 17 and is attached or integral to it. Batch 30 is intermittently delivered to the storage hopper 29 such as via conveyor 31 to provide batch to the storage hopper 29. In certain embodiments, batch delivery 30 free falls into the storage hopper 29. The batch delivery is terminated before the batch top level in the storage hopper 29 reaches the level of the conveyor 31. In certain embodiments, the top of the storage hopper is not connected to any other equipment, and the storage hopper 29 and heat exchanger 17 are completely supported on one or more load cells 32. A hopper 33 (e.g., a conical hopper) is supported from the heat exchanger 17. In this way the one or more load cells 32 continuously measure the weight of heat exchanger 17, storage hopper 29, hopper 33 and their batch contents.

In certain embodiments, hopper 33 is situated below the heat exchanger 17 so that heated batch will feed out of the bottom of the hopper 33 through a spout 34. The hopper 33 is filled with heated batch. Heated batch flows through the spout 34 into the feed screw 35. The spout 34 is configured so that it does not touch a feeder, such as a feed screw 35, enabling the one or more load cells 32 to give a true measure of the total weight of the storage hopper 29, heat exchanger 17 and hopper 33. During the intervals when there is no batch 30 delivered to the storage hopper 29, the load cell(s) will show a weight that is decreasing with time. The load cell measurements can then be gathered over time and averaged to determine the batch feed rate (BFR) usually expressed as pounds per hour.

Figure 3A:
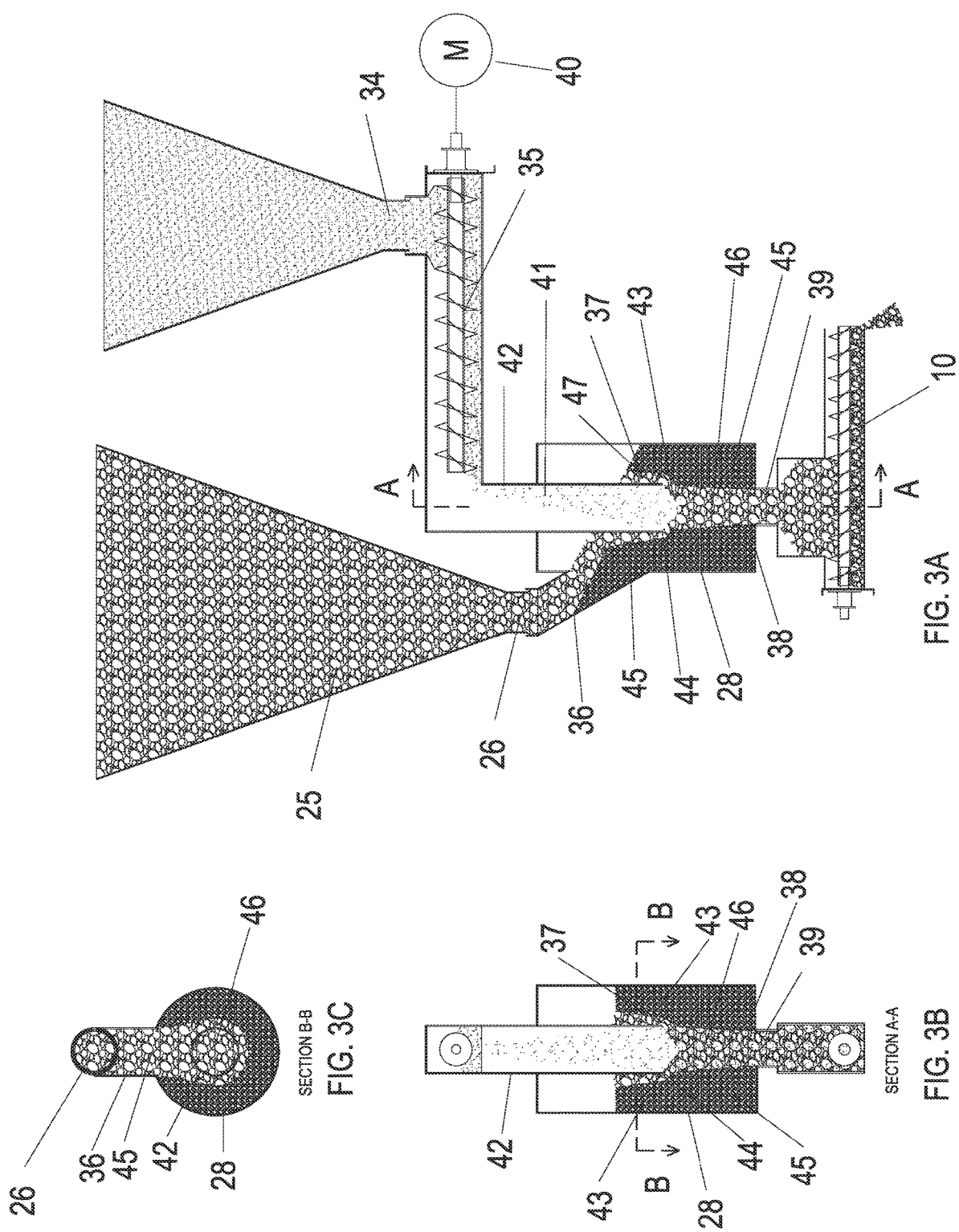
FIG. 3A is an orthogonal cross-sectional view of a proportioning cylinder apparatus in accordance with certain embodiments.

FIGS. 3A, 3B and 3C are orthogonal cross-sectional views of the BCP system in accordance with certain embodiments. Cullet flows through spout 26 such as by gravity, through chute 36 and into the side opening 45 of the chamber or housing, such as proportioning cylinder (hereinafter proportioning cylinder 28). Inside the proportioning cylinder 28 the cullet fills up to surface 47 determined by its angle of repose. Proportioning cylinder 28 may be equipped with a chute 42 that is preferably centrally located and is deep enough so that cullet can flow freely at 43 around all sides of chute 42. Chute 42 is long enough so its lower open end 44 is below surface 47. In one suitable configuration, the diameter of proportioning cylinder 28 is 1200 mm, the diameter of chute 42 is 400 mm, the diameter of spout 39 is 300 mm, the angle of repose of material is 35 degrees from horizontal, and the distance between the floor of proportioning cylinder 28 and the bottom of chute 42 is 600 mm. Floor 38 is fitted with discharge spout 39. Discharge spout 39 is of smaller diameter than chute 42. Discharge spout 39 defines the diameter of the "rat-hole" flow. If discharge spout 39 is of larger diameter than chute 42, cullet from spout 26 could flow out of spout 39 preferentially over material deposited into chute 42. This could result in the material fed into 42 not flowing out as fast as it is fed in, and the material level inside 42 would rise until it blocks the screw feeder discharge. The device must feed all material fed into 42, otherwise the ratio control function would be lost. From discharge spout 39, cullet flows by gravity into furnace charging machine 10. Chute 42 is short enough so its lower end 44 is enough above spout 39 so cullet can flow freely into spout 39. At the bottom of chute 42, cullet forms a surface 43 by its angle of repose, essentially creating a free surface at the bottom of chute 42. In certain embodiments, the cullet is supplied to the proportioning cylinder 28 in a flood feed condition. The cullet is stagnant 45 on the floor 38. Hoppers full of granular material with flat floors will create a flow pattern called "rat-hole" flow. Only a defined column of material 46 immediately above the discharge spout 39 will move while much of the hopper fill will be stagnant 45. The rat-hole flow 46 is aligned with batch infeed chute 42. Because of this rat-hole design, all material discharged from feed screw 35 into the infeed chute 42 will be fed out of the discharge spout 39. So long as the feed rate of feed screw 35 is less than charging machine 10, chute 42 will remain empty. Material fed into chute 42 will free fall onto surface 43 and go into the rat hole 46. If the feed rate of charging machine 10 exceeds the feed rate of screw feed 35, then cullet will feed at 37 around the outside of chute 42 so that the sum of the feed rate plus the cullet flow equals the feed rate of the charging machine 10. This design enables the device to operate effectively with any desired cullet ratio mixture.

In certain embodiments, batch from spout 34 is fed by feed screw 35 in a controlled fashion. The feed rate of batch (lb/hr) may be controlled by the rotational speed of feed screw 35 as driven by motor 40. The feed screw 35 discharges batch 41 into chute 42. Chute 42 is substantially vertical and batch 41 free falls through the chute 42. Chute 42 is long enough that it extends below the surface 47 of cullet during normal operation (e.g., after start-up). Chute 42 is located directly above the discharge spout 39. Batch 41 free falls in chute 42 and deposits onto cullet surface 43. The batch is supplied to the hopper 29 in a starved feed condition; defined as the condition where material flows out of the receiving device as fast as it is fed in, i.e., material does not accumulate in the receiving device.

If the diameter of chute 42 is substantially the same or larger than the diameter of spout 39, and the feed rate of batch from feed screw 35 is less than the total feed rate of material in charging machine 10, then all the deposited batch from feed screw 35 will flow down and be blended with the cullet flow. If the feed rate of feed screw 35 were the same as the feed rate of the charging machine 10, then the charging machine 10 would receive all its input material from feed screw 35 and none from cullet spout 26. This is due to the rat-hole design. If the rate of feed screw 35 were ½ of the charging machine 10 rate, the charging machine would receive all the material from feed screw 35 and enough material from spout 26 to satisfy its need for material, resulting in a 50:50 mixture of batch and cullet. The ratio of cullet to batch can thus be controlled by only adjusting the rate of feed screw 35.

With this design, the apparatus can provide for any desired cullet ratio in feed material to the furnace. For example. If feed screw 35 is stopped completely, the furnace feed will be 100% cullet. If the feed screw 35 speed is controlled so that it delivers batch comprising 40% of the furnace feed provided by charging machine 10, the cullet ratio will be 60%. If the feed screw 35 speed is controlled so that it delivers batch comprising 90% of the furnace feed, the cullet ratio will be 10%.

The device may fail, and batch will fill chute 42 until it blocks discharge of batch from feed screw 35, jamming the screw, in either of these two conditions:

1. Diameter of chute 42 is less than that of spout 39—cullet will preferentially flow into spout 39 and not all the batch deposited on surface 43 will be carried away with the flowing cullet.

2. Feed rate of batch from feed screw 35 exceeds the feed rate of furnace charging machine 10—not all the batch deposited on surface 43 will be carried away with the flowing cullet.

To provide effective control of cullet ratio, at least one of the batch or cullet storage hoppers should be mounted on one or more load cells or the like to provide real time information on the mass feed rate of material, either batch or cullet, as described for cullet earlier. Generally, the glass production plant is equipped with monitoring equipment to provide real time information of the mass production rate of the furnace, typically called the "Pull Rate" (PR) or Glass Furnace production Rate, generally given in pounds per hour, or tons per day.

Figure 4:
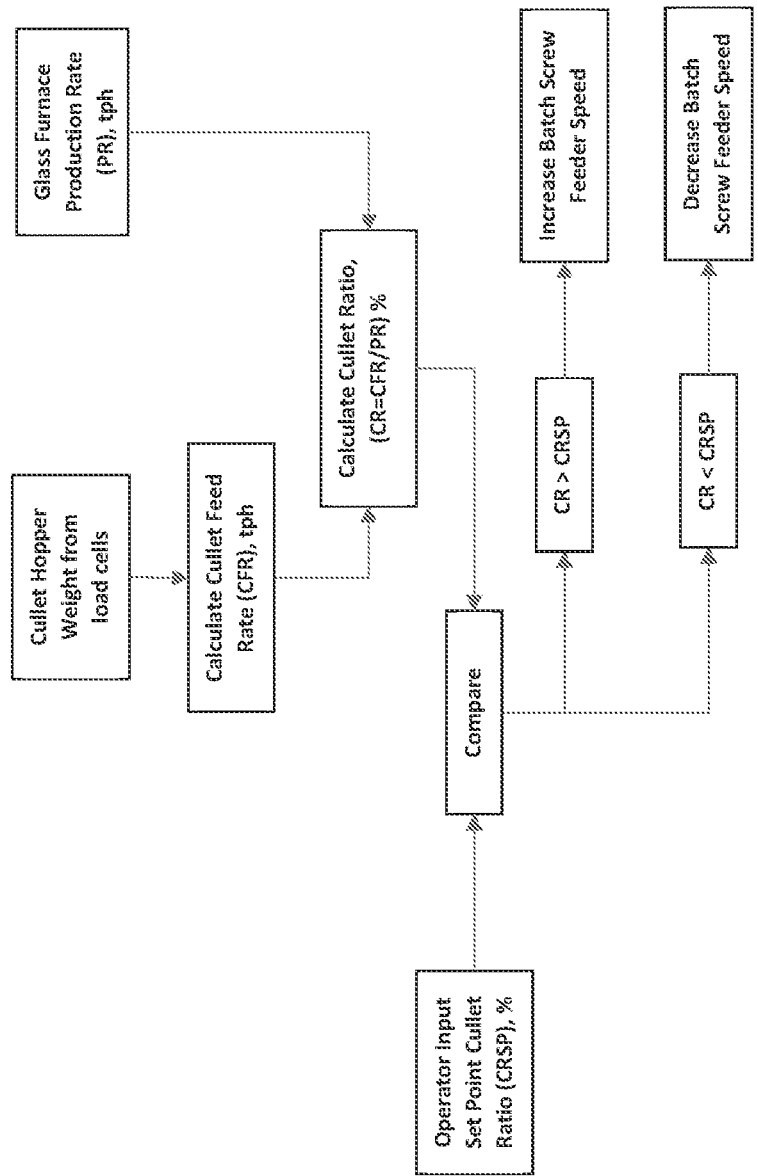
FIG. 4 is a flow diagram of a scheme to control cullet ratio of a furnace in accordance with certain embodiments.
Figure 5:
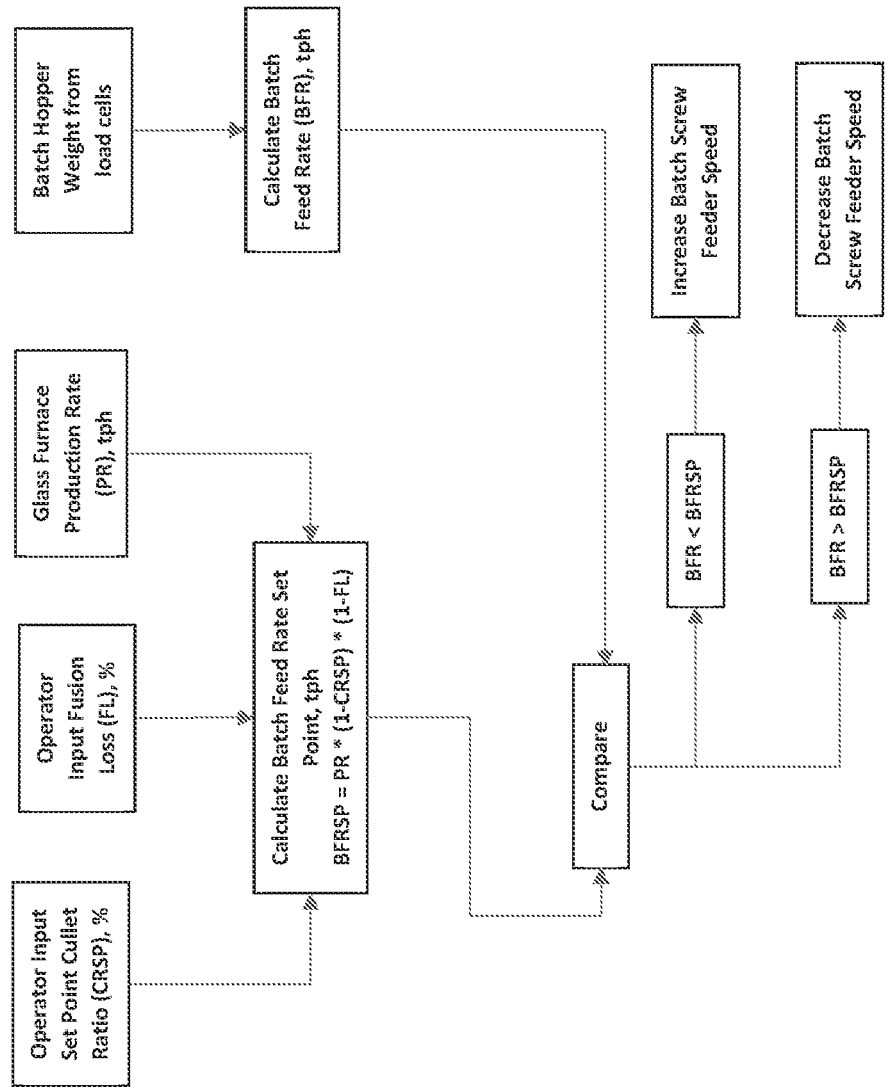
FIG. 5 is another flow diagram of a scheme to control cullet ratio of a furnace in accordance with certain embodiments.
Figure 6:
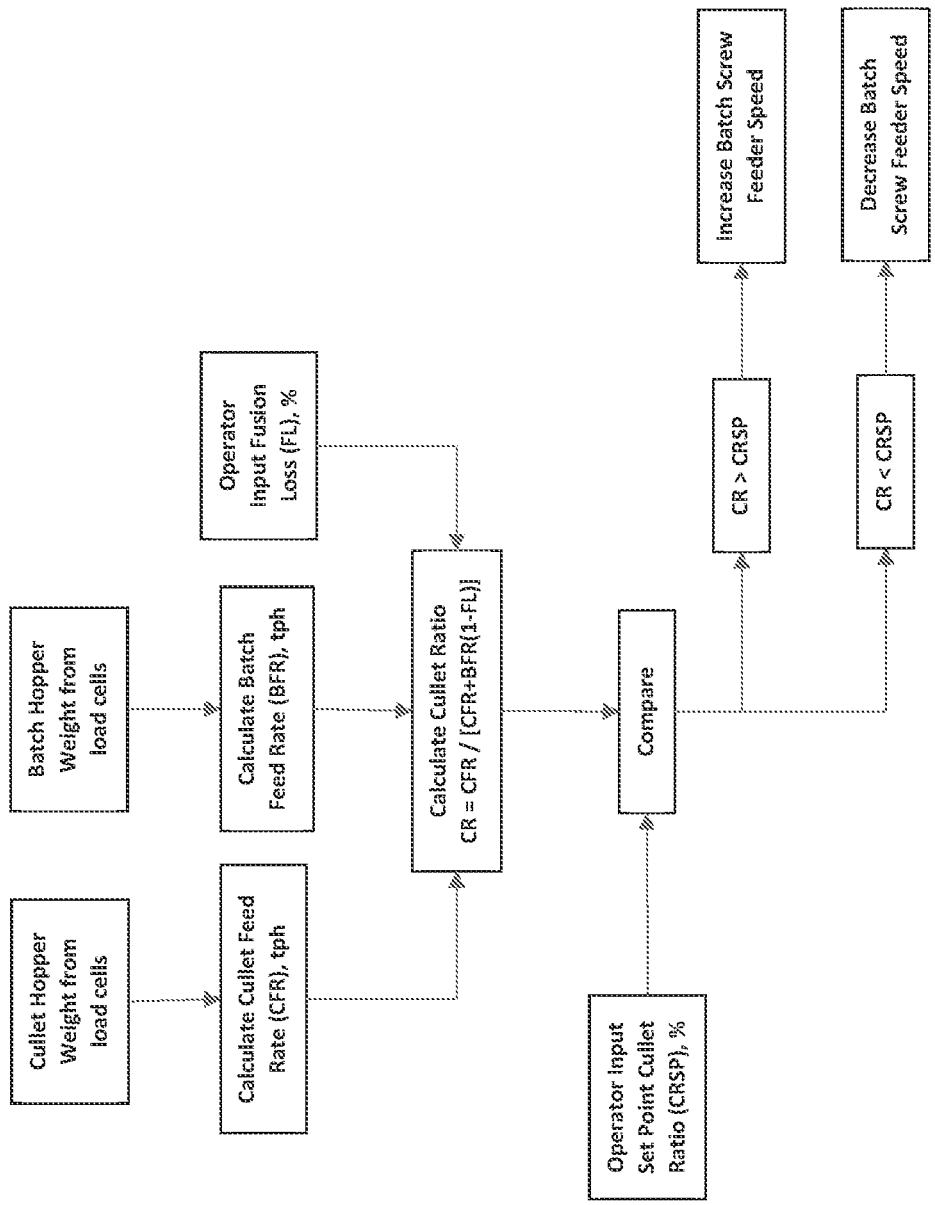
FIG. 6 is yet another flow diagram of a scheme to control cullet ratio of a furnace in accordance with certain embodiments.

In various embodiments, one or more of the following three schemes may be used to control cullet ratio of the furnace:

1. Use of cullet hopper load cell 24 information—this information may be gathered by a computer system to determine the weight of material in the cullet hopper in real time and calculate the cullet feed rate in real time according to the procedure detailed above to calculate the cullet feed rate (CFR). The furnace pull rate (PR) is normally measured by conventional means at the glass factory, being defined as the mass rate of glass production and expressed in units tons per hour, tph. Cullet Feed Rate is normally expressed in units of tons per hour, tph. The CFR is compared to furnace pull rate PR to calculate the instantaneous cullet ratio CR. The instantaneous cullet ratio is compared to the desired cullet ratio and adjustments are made to the batch feed screw to change the batch rate and thus adjust the instantaneous cullet ratio. The computer system uses the cullet hopper load cell information to calculate the cullet feed rate (CFR) and calculate the furnace cullet ratio (CR) as CR=CFR÷PR. The computer system compares the calculated CR to an operator input cullet ratio set point (CRSP). The computer system increases the batch feeder rate if CR>CRSP and decreases the batch feeder rate if CR<CRS. These increases and decreases may be performed periodically, normally with a PID type controller, in such a way that the batch feeder maintains the cullet ratio at its desire set point. A flow diagram of this procedure is shown as FIG. 4.
2. Use of the batch hopper load cell 32 information–this information may be gathered by a computer system to determine the weight of material in the batch hopper in real time and calculate the batch rate in real time, according to the procedure detailed above to calculate the batch feed rate (BFR). The furnace pull rate (PR) is normally measured by conventional means at the glass factory, being defined as the mass rate of glass production. Fusion Loss (FL) is defined as the mass percentage of batch fed into the furnace that is volatilized in the furnace and carried out of the furnace with exhaust gases. Glass From Batch (GFB) is defined as the glass produced from batch. In general, if batch is fed into a furnace with Batch Rate (BR), the resulting Glass From Batch (GFB=BR*(1−FL)). Batch Feed Rate is normally expressed in units of tons per hour, tph. The furnace pull rate and desired cullet ratio are used to calculate the desired batch rate. The instantaneous batch rate is compared to the desired batch rate and adjustments are made to the batch screw feeder to change batch rate and achieve the desired batch feed rate. The computer system uses the batch hopper load cell information to calculate the batch feed rate (BFR). The computer system uses the operator input cullet ratio set point (CRSP), operator input fusion loss FL, and PR to calculate a set point of batch feed rate (BFRSP). The computer system compares the calculated BFR to the BFRSP. The computer system decreases the batch feeder rate if BFR>BFRSP and increases the batch feeder rate if BFR<BFRSP. The increases and decreases are performed periodically, normally with a PID type controller, in such a way that the batch feeder maintains the cullet ratio at its desired set point. A flow diagram of this procedure is shown as FIG. 5.
3. Use of both cullet hopper load cell 24 information and batch hopper load cell 32 information—this information may be gathered by a computer system to determine the weight of material in the cullet hopper in real time and calculate the cullet feed rate CFR in real time the weight of material in the batch hopper in real time and calculate the batch feed rate BFR in real time. The ratio of these is compared to the desired ratio and adjustments are made to the batch screw feeder to change batch rate and achieve the desired ratio. The computer system uses the batch hopper load cell information to calculate the batch feed rate (BFR) and the cullet hopper load cell information to calculate the cullet feed rate (CFR). The computer system further calculates the cullet ratio as CR=CFR÷(CFR+BFR*(1−FL)). The computer system uses the operator input cullet ratio set point (CRSP), operator input fusion loss FL and CR to increase or decrease the batch feeder rate. If CR>CRSP, the batch feeder rate will be increased. If CR<CRSP, the batch feeder rate will be decreased. These increases and decreases being performed periodically, normally with a PID type controller, in such a way that the batch feeder maintains the cullet ratio at its desired set point. A flow diagram of this procedure is shown as FIG. 6.

For any of the control systems described herein, a suitable controller may be used, such as a controller having a processing unit and a storage element. The processing unit may be a general-purpose computing device such as a microprocessor. Alternatively, it may be a specialized processing device, such as a programmable logic controller (PLC) or a proportional-integral-derivative controller (PID). The storage element may utilize any memory technology, such as RAM, DRAM, ROM, Flash ROM, EEROM, NVRAM, magnetic media, or any other medium suitable to hold computer readable data and instructions. The controller unit may be in electrical communication (e.g., wired, wirelessly) with one or more of the operating units in the system, including one or more valves, actuators, sensors, load cells, feeders, etc. The controller also may be associated with a human machine interface or HMI that displays or otherwise indicates to an operator one or more of the parameters involved in operating the system and/or carrying out the methods described herein. The storage element may contain instructions, which when executed by the processing unit, enable the system to perform the functions described herein. In some embodiments, more than one controller may be used.

Example 1

Figure 7A:
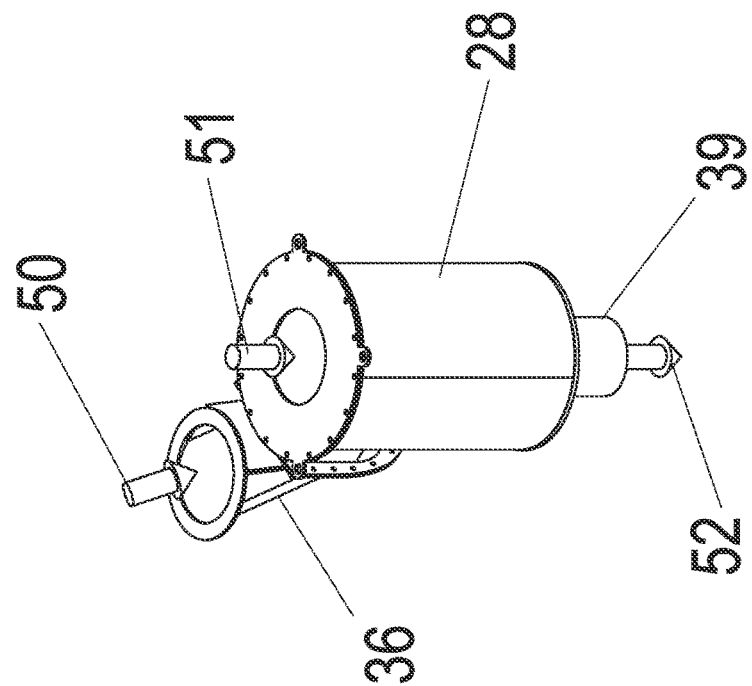
FIG. 7A is an isometric view of a working example of apparats in accordance with certain embodiments.
Figure 7B:
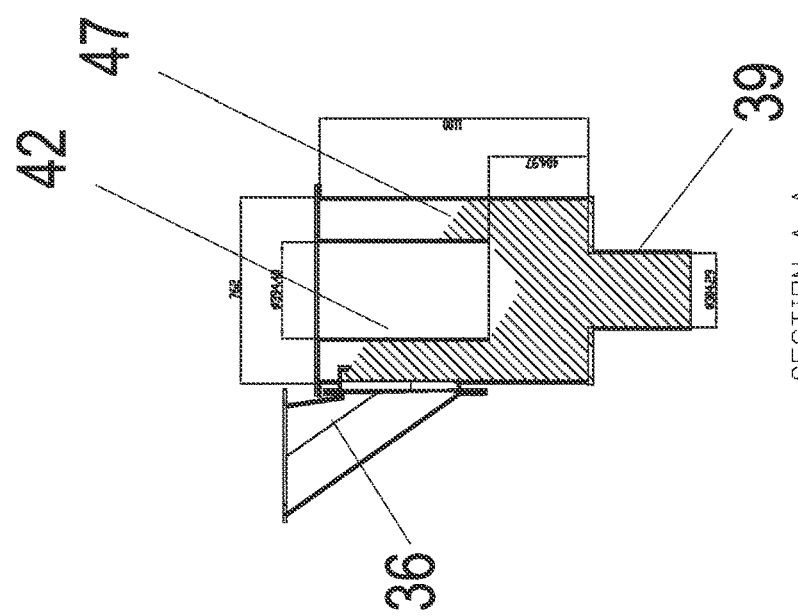
FIG. 7B is a cross-sectional view of the apparatus of FIG. 7A, taken along line A-A of FIG. 7C.
Figure 7C:
FIG. 7C is a front view of the apparatus of FIG. 7A.

FIG. 7A is an isometric view of a working example of a preferred embodiment. Proportioning Cylinder 28 receives cullet at 50 in flood feed conditions via chute 36. Batch at 51 is delivered from a screw feeder and allowed to free fall into 42. Mixed and proportioned material exits the device via spout 39 in flood feed condition to charging machine (not shown). FIG. 7B is a cross-sectional view, indicating actual dimensions of a suitable device. FIG. 7C shows the cross-sectional plane for FIG. 7B. Cullet fills the Proportioning Cylinder 28 to form surface 47 at its angle of repose. The device shown is designed for a furnace with a pull rate of 175 tons per day (=7.3 tph) of glass with a cullet ratio of 65% (=4.74 tph). Such a device would receive batch from the screw feeder at a nominal rate of 3.1 tph. The speed of the batch feed screw is controlled to maintain the desired cullet ratio of 65% according to one of the three algorithms described above.

What is claimed is:

1. Apparatus for blending batch and cullet and controlling their respective amounts to achieve a predetermined cullet ratio to be fed to a furnace, said apparatus comprising:
    a first hopper for holding cullet;
    a second hopper for holding batch;
    a rate adjustable feeder associated with said second hopper;
    a chamber positioned to receive cullet from said first hopper, said chamber having a floor for accumulation of cullet from said first hopper, an inlet spout configured to receive cullet from said first hopper so that cullet flood feeds into said chamber to keep it constantly filled with cullet up to its angle of repose, and an outlet spout;
    a chute positioned to receive batch from said rate adjustable feeder, said chute extending into said chamber and having a chute outlet, said chute outlet having a diameter equal to or larger than said outlet spout and being spaced from said outlet spout;
    a rate adjustable charger for receiving mixed batch and cullet from said chamber; and
    a controller operatively connected to said rate adjustable feeder and to said rate adjustable charger for controlling the amount of batch fed to said chute and for feeding mixed batch and cullet having said predetermined cullet ratio to said furnace.

2. The apparatus of claim 1, wherein said chute is positioned directly above said outlet spout.

3. The apparatus of claim 1, wherein said chute outlet is positioned above said outlet spout a distance of at least one times the diameter of said outlet spout.

4. The apparatus of claim 1, further comprising one or more load cells configured to continuously measure the weight of said first hopper and its contents.

5. The apparatus of claim 1, further comprising one or more load cells configured to continuously measure the weight of said second hopper and its contents.

6. The apparatus of claim 1, further comprising a preheater configured to preheat cullet prior to it being fed to said chamber.

7. The apparatus of claim 1, further comprising a preheater configured to preheat batch prior to it being fed to said chamber.

8. A system for regulating the cullet ratio of a mixture of cullet and batch to be fed to a furnace, said system comprising:
    a first hopper for holding cullet;
    a second hopper for holding batch;
    a rate adjustable feeder associated with said second hopper;
    a chamber positioned to receive cullet from said first hopper, said chamber having a floor for accumulation of cullet from said first hopper, an inlet spout configured to receive cullet from said first hopper so that cullet flood feeds into said chamber to keep it constantly filled with cullet up to its angle of repose, and an outlet spout;
    a chute positioned to receive batch from said rate adjustable feeder, said chute extending into said chamber and having a chute outlet, said chute outlet having a diameter equal to or larger than said outlet spout and being spaced from said outlet spout;
    a rate adjustable charger for receiving mixed batch and cullet from said chamber;
    a first load cell for measuring the weight of said first hopper and cullet contained therein;
    a second load cell for measuring the weight of said second hopper and batch contained therein;
    a controller in communication with said first and second load cells and operatively connected to said rate adjustable feeder and to said rate adjustable charger for controlling the amount of batch fed to said chute and for feeding mixed batch and cullet having said predetermined cullet ratio to said furnace.

* * * * *